United States Patent [19]

Riley

[11] Patent Number: 4,635,159
[45] Date of Patent: Jan. 6, 1987

[54] TRANSIENT VOLTAGE SUPPRESSION DEVICE ASSEMBLY

[75] Inventor: Leon H. Riley, Huntsville, Ala.

[73] Assignee: The United States of America as represented by the Secretary of the Army, Washington, D.C.

[21] Appl. No.: 778,941

[22] Filed: Sep. 23, 1985

[51] Int. Cl.[4] .............................................. H02H 9/04
[52] U.S. Cl. .................................... 361/111; 361/117
[58] Field of Search ............... 361/111, 117, 119, 126, 361/127, 131, 132; 337/28, 29, 32, 33, 34

[56] References Cited

U.S. PATENT DOCUMENTS

| | | | |
|---|---|---|---|
| 2,644,115 | 6/1953 | Sands | 361/119 |
| 4,396,970 | 8/1983 | Scudner | 361/117 |

FOREIGN PATENT DOCUMENTS 182545  5/1936  Switzerland ...................... 361/117

Primary Examiner—A. D. Pellinen
Assistant Examiner—H. L. Williams
Attorney, Agent, or Firm—Freddie M. Bush; Robert C. Sims

[57] ABSTRACT

This transient voltage suppression device (TVSDA) provides for two sets of connectors (one input and one output) to be mounted in a single plane. Voltage suppression devices are connected, in a low parasitic inductance fashion, between leads interconnecting separate connector pins and the body of the TVSDA. The TVSDA has a minimum VSD lead length.

5 Claims, 4 Drawing Figures

TRANSIENT VOLTAGE SUPPRESSION DEVICE ASSEMBLY

DEDICATORY CLAUSE

The invention described herein may be manufactured, used, and licensed by or for the Government for governmental purposes without the payment to me of any royalties thereon.

RELATED APPLICATIONS

U.S. application Ser. No. 797,345, filed Nov. 8, 1984, and Ser. No. 801,024, filed Nov. 22, 1984, are copending.

BACKGROUND OF THE INVENTION

Present Transient Voltage Suppression Device Assemblies (TVSDA) do not adequately provide for the parasitic inductance of the individually installed voltage suppression device (VSD). VSD lead length must be maintained as short as possible so that the VSD can provide high frequency or high rate of rise voltage suppression. This invention provides for a TVSDA such that VSD lead length and associated inductance is reduced to a minimum. Its performance is estimated at least 10 times better than any existing TVSDA when suppressing electrical transients with rise times greater than 1.0 microsecond.

This invention has the following advantages over previous assemblies of this type:

(1) The mounting of the VSD is such that minimum VSD lead length is required.

(2) Assembly and maintenance of the TVSDA is simplified by providing access into the interior of the assembly after removing a single cover (3) The assembly is lighter, requires less volume and fewer parts than similar assemblies known to be available at this time.

(4) The assembly provides for installation of multiple VSD's. Semiconductor, gas discharge and variable resistance devices may be installed in any combination on any of the circuits passing through the TVSDA. Filtering may be installed with limited efficiency.

DESCRIPTION OF THE BEST MODE AND PREFERRED EMBODIMENTS

Figure 1B:
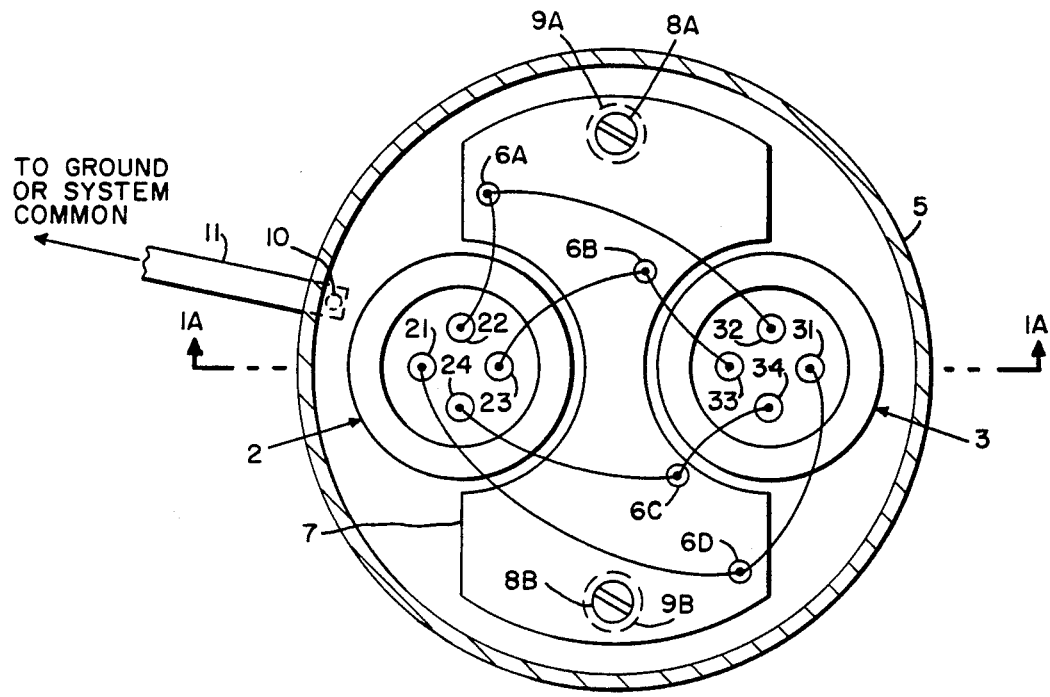
FIGS. 1A and 1B show diagrammatically a single plane transient voltage suppression device in accordance with the present invention.
Figure 1A:
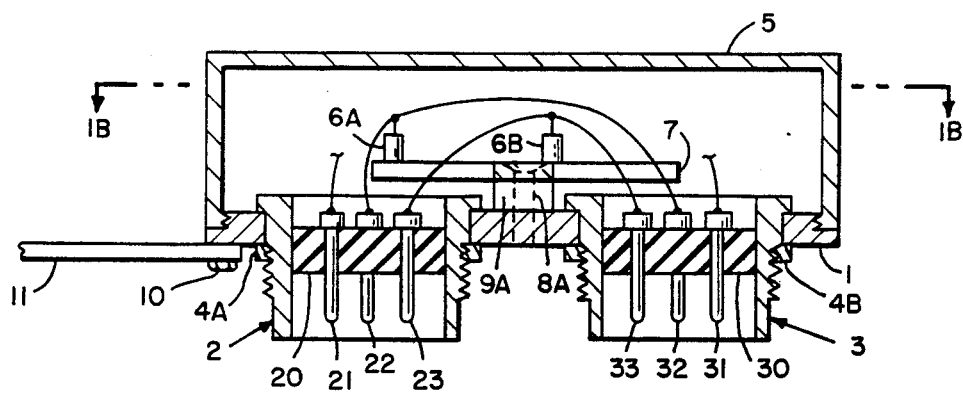

FIGS. 1A and 1B show a single plane transient voltage suppression device (TVSDA) with threaded cover. Side view A—A and top view B—B are shown. Sections are provided for greater clarity in the figures. The single plane refers to the electrically conductive disk that serves as a base plate 1 for the assembly. Multipin connectors 2 and 3 are shown passing through the base plate 1. Insulators 20 and 30 isolate the conductors 21-24 and 31-34. Connectors are not necessary, as single or multiconductor cables may be passed through these openings and restrained at or inside the assembly. Jam nut for connectors 2 and 3 are shown in cross sections as jam nuts 4A and 4B. Flange mount or other type connectors may be used. The threaded cover 5 is shown covering and protecting the internal components from electromagnetic energies. VSD's 6A-6D are shown mounted to an electrically conductive base 7. This base 7 is attached to the base plate 1 both physically and electrically by conductive screws 8A and 8B and tube stand-offs 9A and 9B. The base 7, screws 8 and tube standoffs 9 are not necessary when the VSD's are mounted directly to the base plate 1. This variation is not shown in the drawing. The base plate 1 is electrically tied to ground or systems common by a screw 10 and ground strap 11. Either connector 2 or 3 may be used for input or output. Assuming 2 as the input and 3 as the output and selecting one of many normal electrical paths then current passes through pin 23 in connector 2 to the VSD 6B and on through pin 33 in connector 3. Normally the VSD 6B would not electrically influence the circuit but when an over voltage occurs at the VSD 6B it will change impedance and shunt electrical energy away from the circuit it is protecting. The shunted energy will be transferred to the ground or system common through 7, 8, 9, 1, 10 and 11. The electrical circuits down stream electrically from the TVSDA are thereby protected from electrical transients.

Figure 2B:
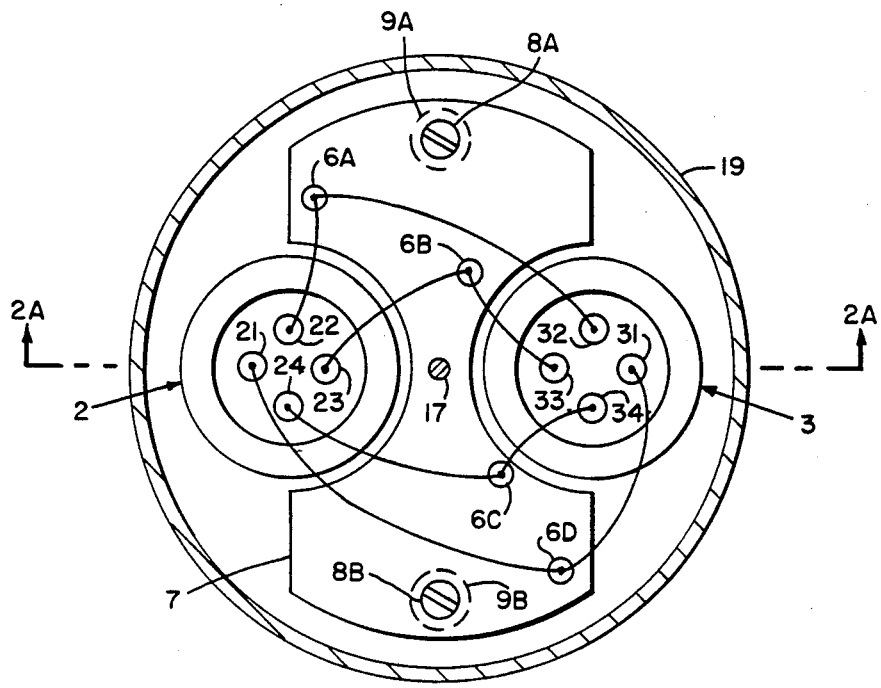
FIGS. 2A and 2B illustrate diagrammatically a further embodiment of the present invention.
Figure 2A:
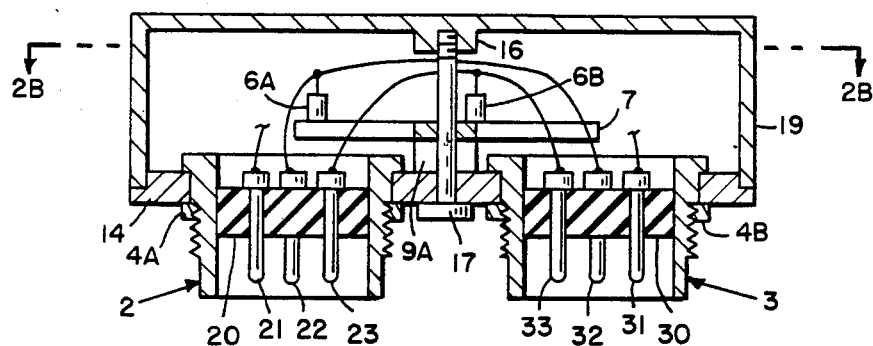

FIGS. 2A and 2B shows a variation of the TVSA with side view A—A and top view B—B. In this variation the base plate 14 is not threaded, but it is center drilled for a screw connection of cover 29. The cover is drilled and taped 16 for the screw 17 to attach in tension and thereby place a compression joining of the cover 15 to the base plate 14. This compression can provide electrical conduction between the cover 29 and base plate 14. The other elements are the same as those shown in FIGS. 1A and 1B.

I claim:

1. A transient over-voltage suppression device comprising an electrical conductive plate; first and second openings in said plate; cover means attached to said plate so as to create a protected enclosure between said plate and cover; an electrical conductive base positioned in said enclosure and being electrically connected to said plate; at least four connectors having individual electrical conductive paths passing from outside said enclosure through the first opening in said plate to inside said enclosure and back through the second opening in said plate to outside; voltage protection means equal in number to the number of conductors for protecting against transient voltage; said protection means having first and second electrical sides and being mounted to said base such that the first side is electrically connected to said base; and the second side of each protection means being electrically connected respectively to a different conductor inside said enclosure so as to shunt electrical energy from the conductor to the base when an over-voltage occurs.

2. A device as set forth in claim 1, wherein said electrically conductive plate is located at a first plane and said base is located in a second plane.

3. A device as set forth in claim 2 further providing a spacer means located between said plate and said base so as to maintain the distance between the plate and the base and to provide an electrical connection between the base and the plate.

4. A device as set forth in claim 3 wherein said cover is screwed onto said plate.

5. A device as set forth in claim 3 further comprising a screw which is passed through said plate and threadedly engaged to said cover so as to fasten said cover to said plate.

* * * * *